US009578276B2

(12) United States Patent
Nishimura

(10) Patent No.: US 9,578,276 B2
(45) Date of Patent: Feb. 21, 2017

(54) SYSTEMS AND METHODS FOR AUTOMATICALLY CONTROLLING MEDIA ASSET PLAYBACK IN A VEHICLE

(71) Applicant: Rovi Guides, Inc., Santa Clara, CA (US)

(72) Inventor: Akitaka Nishimura, Tokyo (JP)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/564,422

(22) Filed: Dec. 9, 2014

(65) Prior Publication Data

US 2016/0165174 A1 Jun. 9, 2016

(51) Int. Cl.
| | | |
|---|---|---|
| *H04N 9/80* | (2006.01) | |
| *H04N 5/91* | (2006.01) | |
| *H04N 21/414* | (2011.01) | |
| *H04N 21/422* | (2011.01) | |
| *H04N 21/433* | (2011.01) | |
| *H04N 5/765* | (2006.01) | |
| *G11B 27/00* | (2006.01) | |

(52) U.S. Cl.
CPC .............. *H04N 5/91* (2013.01); *G11B 27/00* (2013.01); *H04N 5/765* (2013.01); *H04N 21/41422* (2013.01); *H04N 21/42202* (2013.01); *H04N 21/4331* (2013.01); *H04N 21/4333* (2013.01)

(58) Field of Classification Search
USPC ................................................ 386/239–248
See application file for complete search history.

(56) References Cited

U.S. PATENT DOCUMENTS

| | | | |
|---|---|---|---|
| 2004/0036764 A1 | 2/2004 | Hirota | |
| 2005/0273233 A1 | 12/2005 | Sekine | |
| 2008/0018739 A1 | 1/2008 | Hwang et al. | |
| 2008/0066109 A1 | 3/2008 | Dunning et al. | |
| 2010/0110314 A1 | 5/2010 | Kusano | |
| 2011/0162018 A1* | 6/2011 | Dodd ................ | H04N 21/4333 725/78 |
| 2013/0184932 A1* | 7/2013 | Dove ............... | H04N 21/41407 701/36 |
| 2015/0249906 A1* | 9/2015 | Thomas ................ | H04W 4/027 455/418 |

FOREIGN PATENT DOCUMENTS

| | | | | |
|---|---|---|---|---|
| JP | 2004 090891 A | | 3/2004 | |
| JP | 2005-167880 | * | 6/2005 | ............... H04N 5/93 |
| JP | 2005 343241 A | | 12/2005 | |
| JP | 2006 166060 A | | 6/2006 | |
| WO | WO-2013/055471 A2 | | 4/2013 | |

* cited by examiner

*Primary Examiner* — Hung Dang
(74) *Attorney, Agent, or Firm* — Ropes & Gray LLP

(57) ABSTRACT

Systems and methods for method for automatically controlling playback of a media asset in a vehicle are provided. A presentation of a media asset to a user in the vehicle is generated. A motion state of the vehicle is determined. In response to determining that the motion state indicates that the vehicle is moving, the presentation of the media asset is paused. In response to determining that the motion state indicates that the vehicle is not moving, the presentation of the media asset is resumed.

16 Claims, 4 Drawing Sheets

SYSTEMS AND METHODS FOR AUTOMATICALLY CONTROLLING MEDIA ASSET PLAYBACK IN A VEHICLE

BACKGROUND

In conventional systems, media assets are presented to a user in a car completely under control of the user. Usually this results in distracting the driver or requires the driver to decide when to stop/start the media asset. By requiring the driver to manually control media asset playback, dangerous driving situations could arise.

SUMMARY

Accordingly, methods and systems are disclosed herein for automatically controlling media asset playback in a vehicle.

In some embodiments, a presentation of a media asset is generated to a user in the vehicle. For example, the user may select a media asset and the system may access the media asset for presentation to the user. A motion state of the vehicle is determined. Motion state of the vehicle may be determined by accessing motion state circuitry in which motion state information is stored. Motion state information may include information pertaining to the state of the gas/brake pedals, GPS information of the vehicle, acceleration information, speed information, etc. In some embodiments, in response to determining that the motion state indicates that the vehicle is moving, the presentation of the media asset is paused. In some embodiments, in response to determining that the motion state indicates that the vehicle is not moving, the presentation of the media asset is resumed.

In some embodiments, the system may determine whether the user to which the media asset is being presented is the driver of the vehicle. The pausing and resuming of the media asset based on the motion state of the vehicle may be conditioned on whether the user is determined to be the driver. For example, if the user is determined to be the driver, the media asset may be paused when the vehicle is in a moving state and resumed when the vehicle is in a non-moving state. Alternatively, if the user is determined not to be the driver, pausing and resuming of the media asset may not be dependent on the motion of the vehicle.

In some embodiments, the motion state of the vehicle may be determined continuously or periodically while the media asset is being played. Upon detecting a change in the motion state (e.g., from a moving state to a non-moving state), the media asset playback may be adjusted (e.g., paused or resumed). Specifically, if the motion of the vehicle changes from a moving state to a non-moving state, playback of the media asset that was paused while in the moving state may be automatically resumed. If the motion of the vehicle changes from a non-moving state to a moving state, playback of the media asset that was on going while in the non-moving state may be automatically paused.

In some embodiments, when the system determines a need to pause the media asset (e.g., because the vehicle has entered a moving state), the system may automatically begin recording the media asset. For example, the system may determine whether the media asset is linear and needs to be paused. In such circumstances, the system may begin recording or storage of the media asset starting from the current position at which the media asset is being played when the vehicle has entered the moving state. When playback of the media asset subsequently resumes (e.g., when the vehicle enters the non-moving state), the media asset may be retrieved from storage starting from the position at which the media asset was last paused.

In some embodiments, alternate content may be presented to the user while the media asset is paused when the vehicle enters the moving state. In some circumstances, the alternate content may be of a different form than the media asset that was being presented. For example, the media asset may include video and audio and the alternate content may include audio only. In some implementations, the alternate content may include an advertisement for a product, media asset or service selected based on a user profile. In some implementations, the alternate content may be related to the media asset that has been paused. In some implementations, the alternate content may be another media asset that matches a user profile (e.g., a favorite audio asset or radio station). Upon determining that the vehicle has entered the non-moving state, the presentation of the alternate content may be automatically replaced with resumption of playback of the media asset from the point at which the media asset was last paused.

In some embodiments, options presented to the user may be based on whether the vehicle is determined to be in a moving or non-moving state. For example, an option related to media consumption may be presented when the vehicle is in a non-moving state. An option unrelated to media consumption may be presented when the vehicle is in a moving state.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
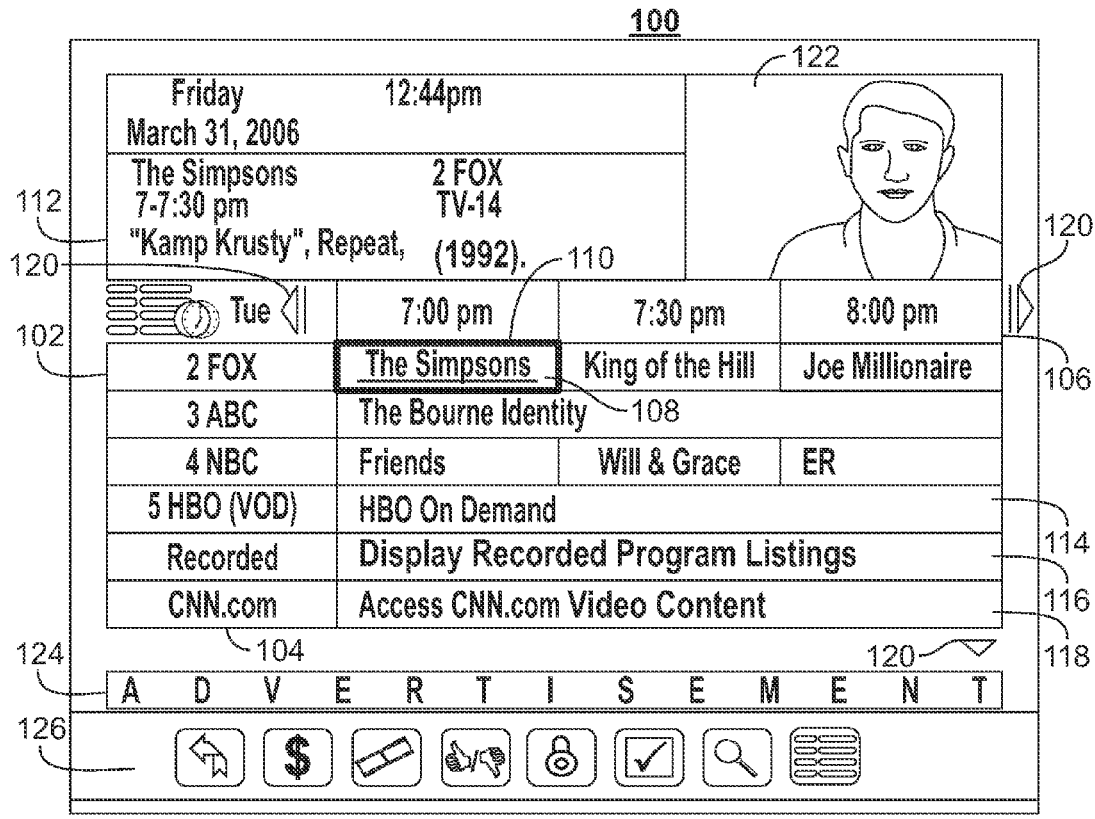
FIGS. 1 and 2 show illustrative display screens that may be used to provide media guidance application listings in accordance with an embodiment of the disclosure.

Methods and systems are disclosed herein for automatically controlling playback of a media asset in a vehicle. As referred to herein, the term "vehicle" refers to any air, water or land machine that is used to transport a person. Vehicles may include cars, planes, boats, ships, motorcycles, bicycles, etc.

With reference to media assets or content, the amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application, media guide application, guide application, or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. In some implementations, the media guidance applications may be implemented in vehicle navigation systems. Interactive media guidance applications may generate graphical user interface screens that enable a user to navigate among, locate and select content. These graphical user interface screens are referred to as displays of the media guidance application. Examples of graphical user interface screens generated by interactive media guidance applications are shown in FIG. 6.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video or audio content stored on a medium (e.g., a DVD or hard drive), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on machine or computer readable media. Machine or computer-readable media includes any media capable of storing data. The machine or computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an embedded or non-embedded component of a vehicle (e.g., a vehicle navigation system), an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), subtitles, media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
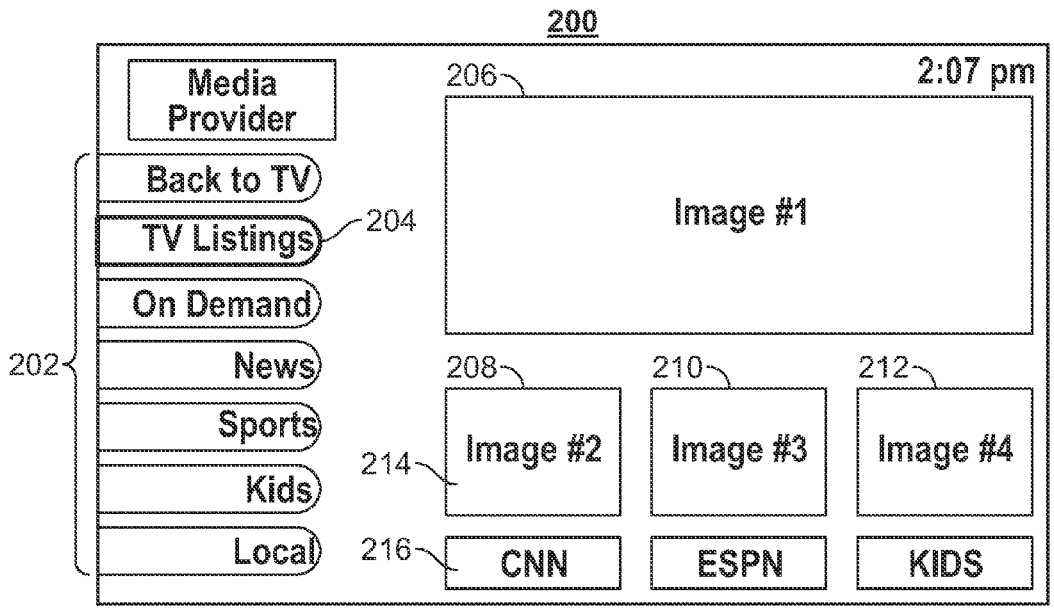

FIGS. 1 and 2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed (e.g., using the same or other media guide displays) in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein. In some embodiments, video presented in video region 122 may be paused/resumed based on motion of the vehicle in which the video is being played. For example, when the vehicle is in a moving state, the video in video region 122 may be paused. Alternatively, when the vehicle is not in a moving state, the video in video region 122 may be resumed from a paused state (e.g., the video may continue being played starting from the play position at which it was last paused).

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases. In some embodiments, advertisement 124 may be presented when a video is paused while the vehicle is in a moving state. Advertisement 124 may be replaced by the video after the video resumes playback when the vehicle is in a non-moving state.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. In some embodiments, the advertisement may be presented in a different form than a video of a media asset that is paused when the vehicle is in a moving state. In particular, the advertisement may be presented in audible form only when the vehicle is in a moving state after the video of the media asset is paused. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein. In some embodiments, the advertisement may be selected based on a current location information (e.g., GPS information) of the vehicle in which the advertisement and video of the media asset is presented.

Options region 126 may allow the user to access different types of content, media guidance application displays (e.g., displays 600), and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, a subtitles setting, or other features. Options available from a main menu display may include search options, VOD options, parental control options, Internet options, cloud-based options, device synchronization options, second screen device options, options to access various types of media guidance data displays, options to subscribe to a premium service, options to enable/disable the subtitles setting, options to edit a user's profile, options to access a browse overlay, or other options. Options presented in options region 126 may relate to media consumption or may be unrelated to media consumption. Specifically, when the vehicle is determined to be in a moving state, options in region 126 may be unrelated to media consumption (e.g., options relating to driving, destination options, vehicle status information options, safety options, etc.). Alternatively, when the vehicle is determined to be in a non-moving state, options in region 126 may be related to media consumption (e.g., volume control options, playback adjustment options, media asset listings options, etc.).

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. For example, the user may specify whether guide shadows are opaque or partially or fully translucent. The user may specify the percentage of translucency the guide shadows have. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

In some embodiments, user profile information may include biometric state and/or emotional state information. For example, the user profile may include associations of biometric states and emotional states with different categories of information based on user interactions with an application. For example, a media guidance application may store a profile of user interactions with action movies when the user is in an angry emotional state and store a profile of user interactions with drama movies when the user is in a depressed emotional state. The media guidance application may provide recommendations based on a determined biometric state and/or emotional state of a user and the stored user profile.

Another display arrangement for providing media guidance is shown in FIG. 2. Video mosaic display 200 includes selectable options 202 for content information organized based on content type, genre, and/or other organization criteria. Selection of option 204 may return the user to grid 102 (FIG. 1).

In display 200 listings 206, 208, 210, and 212 may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210 and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
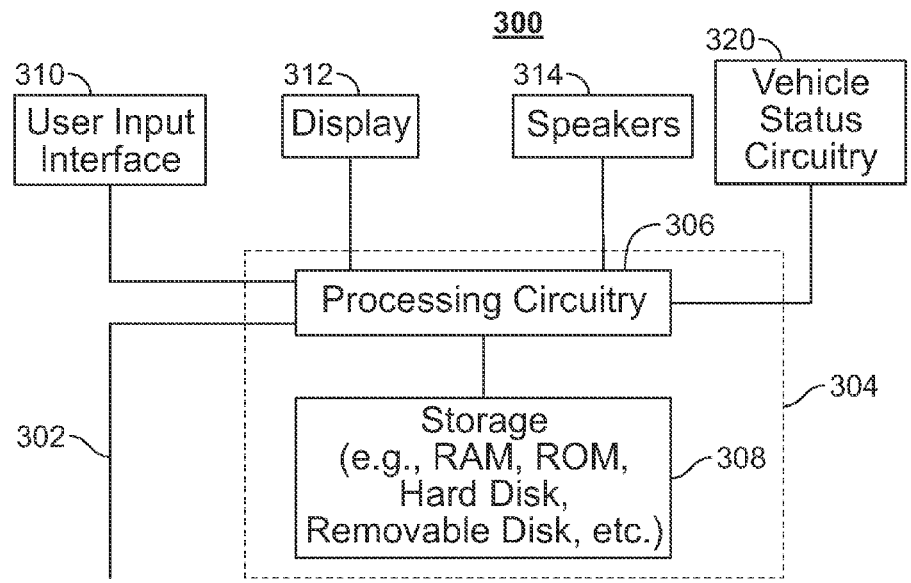
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306, vehicle status circuitry 320 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry may also communicate with vehicle status circuitry 320, which can be used to determine a current state (e.g., motion state) of the vehicle. For example, vehicle status circuitry 320 may provide information about a brake pedal (e.g., whether the brake pedal is engaged or not and for how long the pedal has been engaged). Based on the brake pedal information, control circuitry 304 may determine whether the vehicle is in a moving or non-moving state. Vehicle status circuitry 320 may provide information about whether the vehicle is in a moving or non-moving state. Vehicle status circuitry 320 may provide GPS information about the location of the vehicle and a frequency at which the GPS coordinates change. Based on the frequency at which the GPS coordinates change, control circuitry 304 may determine whether the vehicle is in a moving or non-moving state. Vehicle status circuitry 320 may provide speedometer information about for the vehicle. Based on the speedometer information, control circuitry 304 may determine whether the vehicle is in a moving or non-moving state.

In some embodiments, processing circuitry 306 may determine a location based on global positioning system (GPS) measurements, or, in the case of cellular telephones, measurements based on cell-tower signals, done by detecting circuitry 320. Processing circuitry 306 may use these measurements to determine location coordinates, which may be transmitted to other electronic devices.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. For example, storage 308 may be used to store vehicle motion state information (e.g., whether the vehicle is in a moving or non-moving state). In some embodiments, storage 308 may be used to store a database that maps various vehicle states with indications of whether the vehicle is in a moving or non-moving state. Specifically, each entry in the database may include one or more vehicle states with an indication of whether those states are associated with a moving or non-moving vehicle state. For example, an entry may include vehicle states specifying that the brake pedal has been engaged for more than a predetermined period of time and the location of the vehicle has not changed in more than a predetermined period of time. Such an entry may be associated with a non-moving vehicle state. Alternatively, an entry may include vehicle states specifying that the brake pedal has been engaged for less than a predetermined period of time and that the location of the vehicle has changed over the course of a predetermined period of time. Such an entry may be associated with a moving vehicle state. Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays (including guide shadows) discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
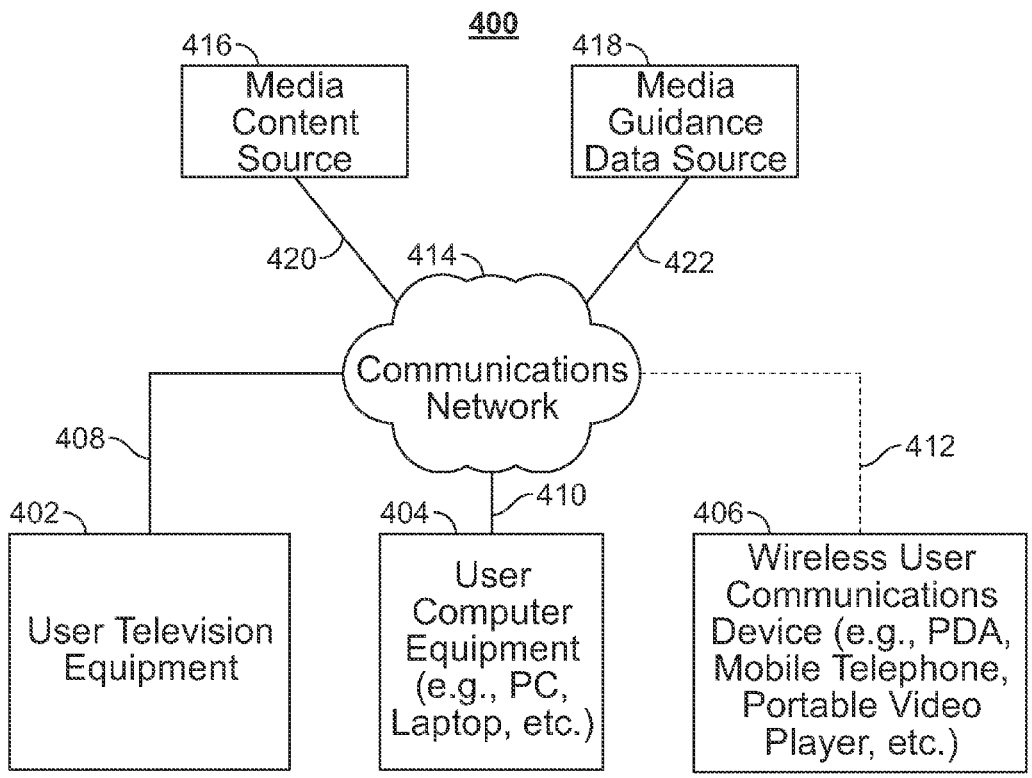
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device. In some embodiments, guide shadows presented with guidance application displays on a second screen device may correspond to media object shadows that were presented on another device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, an in-home network, mobile voice or data network (e.g., a 4G, XLTE, and/or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Paths 412 are drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices and components may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, wireless user communications device 406 may include wearable devices (e.g., monitoring component 316) that are positioned on a user. For example, wireless user communications device 406 may include smart eyewear, smart watches, any other suitable user device that is wearable, or any combination thereof. The type of wearable device may affect the type of biometric state that can be determined. For example, a wearable headset device may include electrodes and may be able to determine and monitor brain activity of a user. For example, a wearable ring device may include a temperature sensor to detect body temperature and may include a pulse oximeter to determine a pulse rate and a blood oxygen level.

Figure 5:
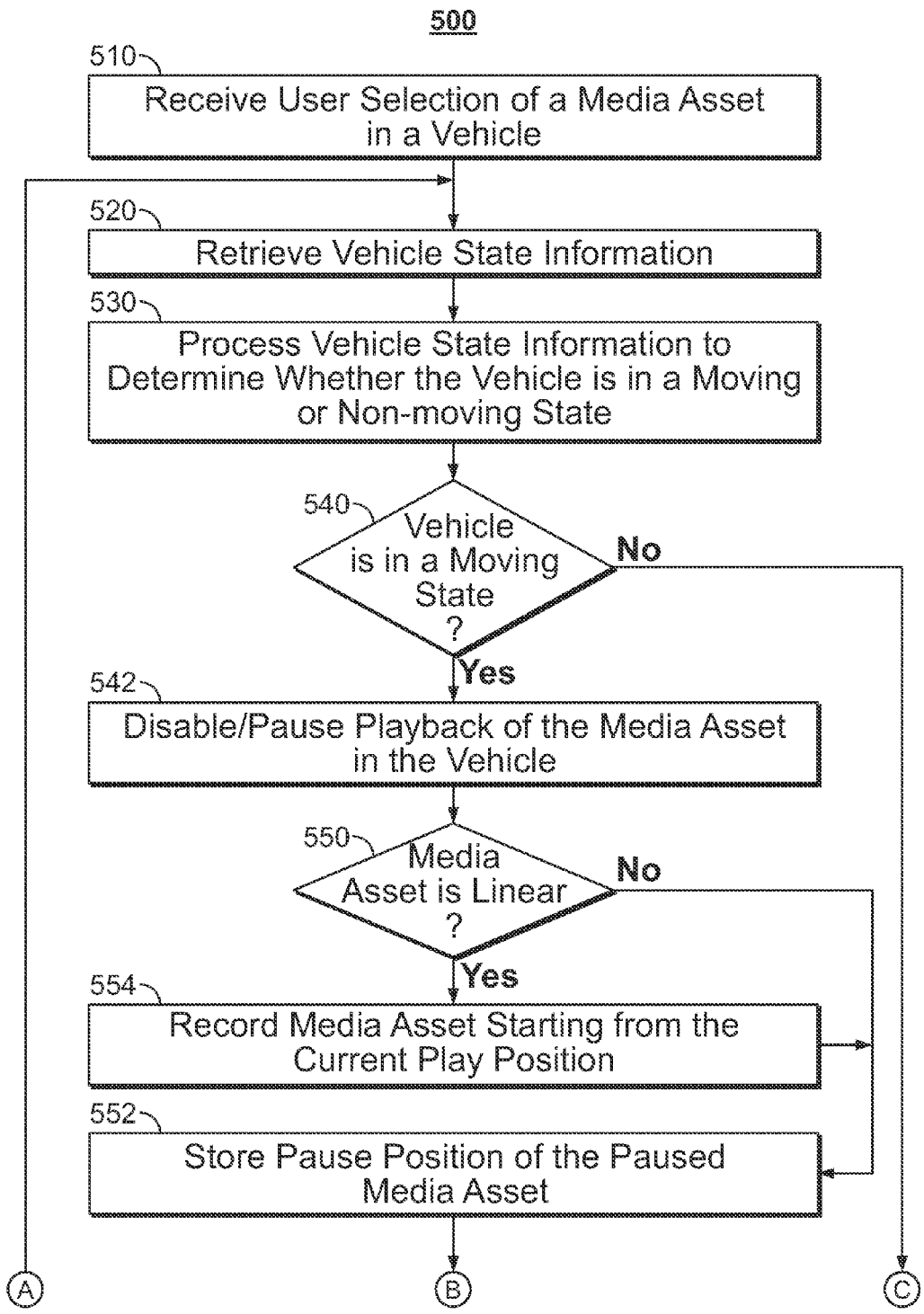
FIG. 5 is an illustrative flow diagram for automatically controlling media asset playback in a vehicle in accordance with some embodiments of the disclosure.
Figure 5:
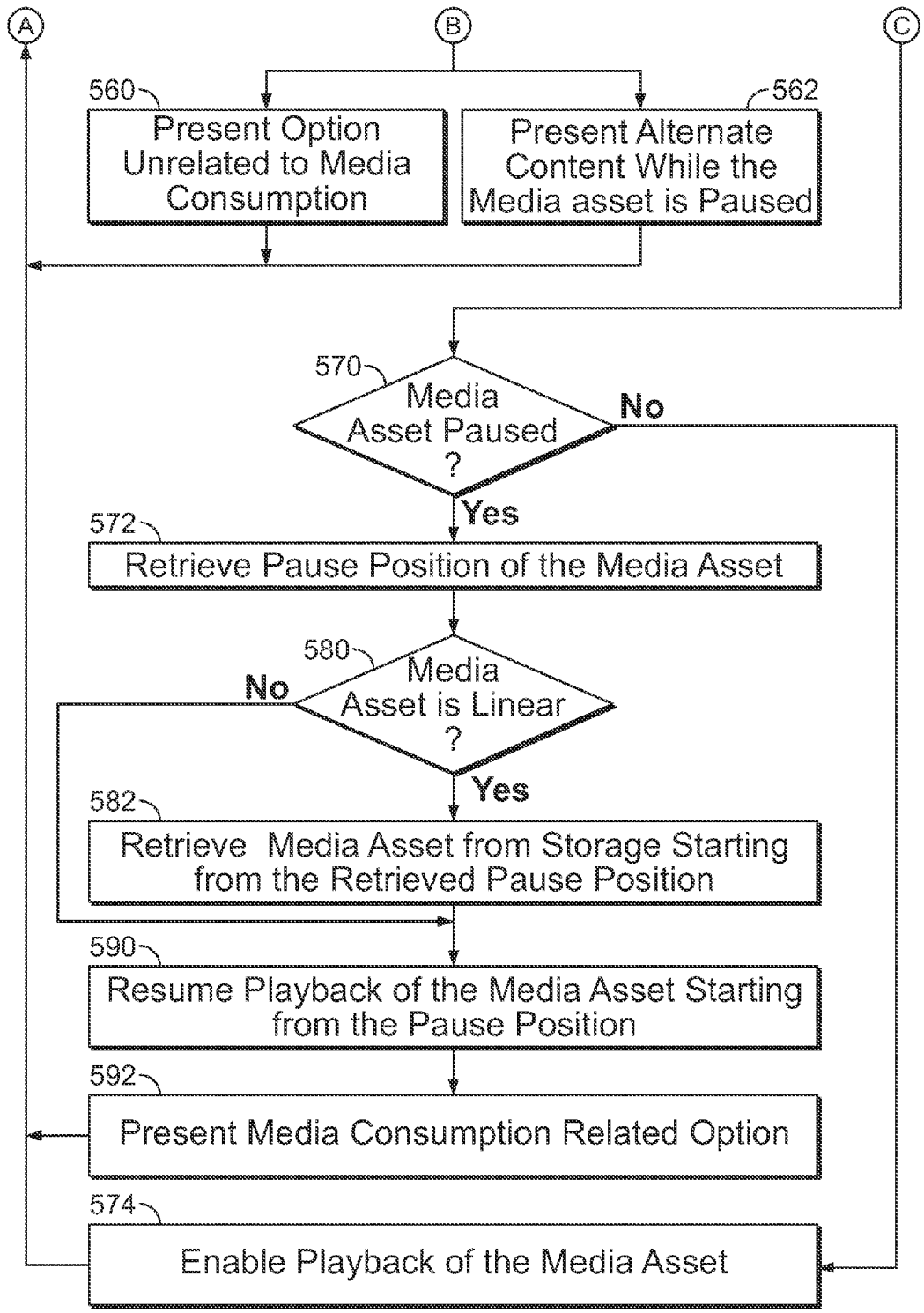

FIG. 5 is an illustrative flow diagram 500 of a process for automatically controlling playback of a media asset in a vehicle in accordance with some embodiments of the disclosure. At step 510, a user selection of a media asset is received in a vehicle. For example, the media guidance application may receive a user selection of a media asset listing (e.g., from a grid similar to that shown in FIG. 1). The media asset listing may correspond to a linear or non-linear media asset. In the case of a linear media asset, the media guidance application may access a current transmission of the media asset from a corresponding source in response to receiving the user selection of the media asset listing. In the case of a non-linear media asset, the media guidance application may request that a source (e.g., a DVD player or an on-demand server) provide the media asset corresponding to the media asset listing.

In some implementations, the media asset is a video that is presented to the user on a screen in a vehicle. The screen may be a dedicated screen built into the vehicle or a screen that is included in a navigation system. In some implementations, the media asset may be presented in a heads-up display for the driver of the vehicle to see.

At step 520, vehicle state information is retrieved. For example, the media guidance application may transmit a request to vehicle status circuitry 320 to retrieve a state of the vehicle. Vehicle status circuitry 320 may provide to the media guidance application at least one of a current speed, an indication of whether the brake and/or acceleration pedals are pressed, GPS information of the vehicle, whether the vehicle is currently in motion or not (e.g., whether the vehicle is in a moving or non-moving state), and/or any other information associated with the vehicle. In some embodiments, the vehicle state information may be retrieved in a continuous or periodic manner in order for the media guidance application to determine changes in the state of vehicle motion. An interrupt may be generated and provided to the media guidance application each time the vehicle state information changes or each time the vehicle changes from a moving state to a non-moving state or vice versa. Upon receipt of the interrupt, the media guidance application may perform steps in FIG. 5 to pause or resume a selected media asset depending on whether the vehicle changed from a moving to a non-moving state or from a non-moving to a moving state.

At step 530, the vehicle state information is processed to determine whether the vehicle is in a moving or non-moving state. For example, the media guidance application may process the information received from vehicle status circuitry 320 to determine whether the information indicates that the vehicle is in a moving or non-moving state. Specifically, the media guidance application may cross-reference some or all of the information received from vehicle status circuitry 320 with a vehicle motion database to determine whether the information being cross-referenced is associated with a moving or non-moving state. In some implementations, information indicating a rapid change in GPS coordinates and that the brake pedal is not activated or pressed may be associated with a moving state of the vehicle in the database. In some implementations, information indicating little or no change in GPS coordinates and that the brake pedal is activated or pressed may be associated with a non-moving state of the vehicle in the database. In some implementations, information indicating speed of the vehicle to be zero or less than a threshold may be associated with a non-moving state of the vehicle in the database. In some implementations, information indicating speed of the vehicle to be more than a threshold may be associated with a moving state of the vehicle in the database.

At step 540, a determination is made as to whether the vehicle is in a moving state. In response to determining that the vehicle is in a moving state, the process proceeds to step 542; otherwise, the process proceeds to step 570. For example, the media guidance application may receive an indication from the vehicle motion database as to whether the cross-referenced vehicle state information corresponds to a moving or non-moving state of the vehicle.

At step 542, playback of the media asset is disabled or paused in the vehicle. For example, when the media guidance application determines that the vehicle in which the selected media asset is being or to be played is in a moving state, the media guidance application may disable or pause the media asset. Specifically, if the media asset has not yet been played, then the media guidance application may prevent the user/driver from playing the media asset when the vehicle is in a moving state. If the media asset playback has already been started, the media guidance application may pause playback of the media asset when the vehicle is in a moving state. By pausing/disabling access to the media asset when the vehicle is in a moving state, the media guidance application automatically avoids distracting the driver with playback of the media asset. As discussed below, in some implementations, when the media asset is paused or disabled (e.g., because the vehicle is in a moving state), the media guidance application may present alternate content (e.g., in a different form) to the driver that is less distracting than the media asset.

At step 550, a determination is made as to whether the media asset is linear. In response to determining that the media asset is linear, the process proceeds to step 554; otherwise, the process proceeds to step 552. For example, the media guidance application may access media guidance data associated with the selected media asset to determine whether the media asset is linear or non-linear.

At step 554, the media asset is recorded starting from the current play position. For example, if the media asset is determined to be linear, the media guidance application may automatically begin recording the media asset if the vehicle is in a moving state and playback of the media asset is paused/disabled. By automatically recording the media asset for which playback has been automatically paused/disabled, the driver/user will not miss any portion of the media asset that is received or transmitted from the source following the point at which playback was paused/disabled. Specifically, because the media asset is linear, there may not be an alternate source that allows the user to access the media asset on demand. Accordingly, to avoid missing any portion of the requested media asset, the media guidance application records the media asset when the vehicle is in a moving state.

At step 552, the pause position of the paused media asset is stored. For example, the media guidance application may store the position at which the playback of the media asset was paused/disabled. Specifically, in response to determining that the vehicle is in a moving state, the media guidance application may pause the media asset and store in storage 308 the position at which playback was paused when the vehicle entered the moving state. In particular, while the vehicle is in a non-moving state, the media guidance application may play back the selected media asset to the user/driver. Substantially contemporaneously with a determination that the vehicle has changed states from a non-moving state to a moving state, the media guidance application may automatically pause/terminate playback by storing the position at which the media asset was played when the change in vehicle motion state has been determined and may record the media asset if the media asset is linear.

At step 560, an option unrelated to media consumption is presented. For example, when the vehicle is determined to be in a moving state, the media guidance application may present options unrelated to media consumption. In some implementations, the media guidance application may exclude any options related to media consumption. Specifically, in response to determining that the vehicle has entered a moving state, the media guidance application may present options pertaining to vehicle navigation, acceleration and vehicle states.

At step 562, alternate content is presented while the media asset is paused. For example, when the vehicle is determined to be in a moving state, the media guidance application may present alternate content. Specifically, the media guidance application may replace the presentation and playback of the selected media asset with alternate content (e.g., advertisements). In some implementations, the media guidance application may identify the format of the media asset that was being presented (e.g., whether the media asset was a video media asset, textual media asset, or audio media asset). The media guidance application may select alternate content that corresponds or does not correspond to the selected media asset and that is of a different format than the media asset. Specifically, if the media asset was a video, the media guidance application may select alternate audio only content that is less distracting to the driver than video. While the media asset playback is disabled/paused, the media guidance application may present the alternate content to the driver/user. When the vehicle returns to the non-moving state, the media guidance application may terminate the presentation of the alternate content and resume playback of the selected media asset.

In some embodiments, the media guidance application may select alternate content for replacing the paused media asset based on user preferences. Specifically, the alternate content may match a user profile. For example, the media guidance application may select a favorite music station or favorite audio media asset of the user for playback while the vehicle is in a moving state. Similarly, the media guidance application may automatically tune a radio in the vehicle to a favorite radio station (e.g., a radio station that matches user preferences) of the user for playing while the vehicle is in a moving state.

In some embodiments, the media guidance application may select alternate content that includes an advertisement for replacing the paused media asset. Specifically, the alternate content may include a voice advertisement of a media asset that matches user preferences. In some embodiments, options relating to media consumption that may be presented when the vehicle enters a non-moving state may include options to purchase media assets that were advertised to the user while the vehicle was in a moving state. Specifically, the media guidance application may track the advertisements that were presented to the user while the vehicle was in a moving state. Upon entering the non-moving state, the media guidance application may access the advertisements that were tracked to identify media assets that correspond to the advertisements. The media guidance application may then generate a display of media asset listings and/or options for access or purchase of the media assets identified as corresponding to the advertisements. The media guidance application may include in the generated display an indication that the media assets correspond to advertisements presented to the user while the vehicle was in the moving state. In some implementations, listings for media assets corresponding to advertisements presented to the user while the vehicle was in the moving state may be visually distinguished from listings of media assets that do not correspond to advertisements presented to the user while the vehicle was in the moving state.

At step 570, a determination is made as to whether the media asset is paused. In response to determining that the media asset is paused, the process proceeds to step 572; otherwise, the process proceeds to step 574. For example, the media guidance application may determine whether the media asset was previously paused (e.g., because the vehicle entered a moving state while the media asset was being played). This indication may be stored in storage 308 by using the position of playback of the media asset. If the playback position is past the start of the media asset, the media guidance application may determine that the media asset was previously paused.

At step 572, a pause position of the media asset is retrieved. For example, the media guidance application may retrieve the pause position of the media asset from storage 308.

At step 580, a determination is made as to whether the media asset is linear. In response to determining that the media asset is linear, the process proceeds to step 582; otherwise, the process proceeds to step 590. For example, the media guidance application may access media guidance data associated with the selected media asset to determine whether the media asset is linear or non-linear.

At step 582, the media asset is retrieved from storage starting from the retrieved pause position. For example, the media guidance application may access the storage device (e.g., storage 308) used to record the linear media asset.

At step 590, playback of the media asset resumes starting from the pause position. For example, the media guidance application may start playing back the media asset starting from the position at which the media asset was paused. In particular, substantially contemporaneously with determining that the vehicle has changed states from a moving to a non-moving state, the media guidance application may automatically resume playing back the media asset that was previously paused as a result of the vehicle previously entering a moving state from a non-moving state.

At step 592, media consumption-related options are presented. For example, when the vehicle is determined to be in a non-moving state, the media guidance application may present options related to media consumption. In some implementations, the media guidance application may exclude any options unrelated to media consumption (e.g., vehicle state information and navigation options). Specifically, in response to determining that the vehicle has entered a non-moving state, the media guidance application may present options pertaining to media consumption (e.g., media asset listings selection screen, fast-forward options, rewind options, playback adjustment options, etc.)

At step 574, playback of the media asset is enabled. For example, the media guidance application may present the media asset to the user/driver.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for controlling playback of a media asset in a vehicle, the method comprising:
   generating a presentation of a media asset to a user in the vehicle, wherein the media asset is presented to the user in a first format;
   determining a motion state of the vehicle;
   in response to determining that the motion state indicates that the vehicle is moving:
     determining whether the media asset is available in a second format;
     pausing the presentation of the media asset that is in the first format;
     presenting the media asset in the second format in response to determining that the media asset, presented in the first format, is available in the second format; and
     generating a presentation of alternate content comprising information identifying a plurality of media assets; and
   in response to determining that the motion state indicates that the vehicle is not moving:
     resuming the presentation of the media asset in the first format; and generating representations of the plurality of media assets to the user.

2. The method of claim 1 further comprising determining whether the user is a driver of the vehicle, wherein the motion state is determined in response to determining that the user is the driver.

3. The method of claim 1 further comprising:
while the media asset is being played, determining based on the motion state that motion of the vehicle has changed from a non-moving state to a moving state; and
contemporaneously with the motion of the vehicle being determined to have changed from the non-moving state to the moving state, pausing the media asset that was being played.

4. The method of claim 3 further comprising:
determining that the media asset is linear; and
initiating storage of the media asset in response to determining that the media asset is linear to pause the media asset.

5. The method of claim 1 further comprising:
while the media asset is paused, determining based on the motion state that motion of the vehicle has changed from a moving state to a non-moving state; and
contemporaneously with the motion of the vehicle being determined to have changed from the moving state to the non-moving state, resuming the media asset that was paused.

6. The method of claim 5 further comprising:
determining that the media asset is linear; and
retrieving the media asset from storage starting from a position at which the media asset was previously paused in response to determining that the media asset is linear to resume the media asset.

7. The method of claim 1 further comprising:
in response to determining that the motion state indicates that the vehicle is moving, generating a first option for presentation to the user; and
in response to determining that the motion state indicates that the vehicle is not moving, generating a second option for presentation to the user.

8. The method of claim 7, wherein the first option relates to media consumption and the second option is unrelated to media consumption.

9. A system for controlling playback of a media asset in a vehicle, the system comprising:
control circuitry configured to:
generate a presentation of a media asset to a user in the vehicle, wherein the media asset is presented to the user in a first format;
determine a motion state of the vehicle;
in response to determining that the motion state indicates that the vehicle is moving:
determine whether the media asset is available in a second format;
pause the presentation of the media asset;
present the media asset in the second format in response to determining that the media asset, presented in the first format, is available in the second format; and
generate a presentation of alternate content comprising information identifying a plurality of media assets; and
in response to determining that the motion state indicates that the vehicle is not moving:
resume the presentation of the media asset in the first format and
generate representations of the plurality of media assets to the user.

10. The system of claim 9, wherein the control circuitry is further configured to determine whether the user is a driver of the vehicle, wherein the motion state is determined in response to determining that the user is the driver.

11. The system of claim 9 wherein the control circuitry is further configured to:
while the media asset is being played, determine based on the motion state that motion of the vehicle has changed from a non-moving state to a moving state; and
contemporaneously with the motion of the vehicle being determined to have changed from the non-moving state to the moving state, pause the media asset that was being played.

12. The system of claim 11, wherein the control circuitry is further configured to:
determine that the media asset is linear; and
initiate storage of the media asset in response to determining that the media asset is linear to pause the media asset.

13. The system of claim 9, wherein the control circuitry is further configured to:
while the media asset is paused, determine based on the motion state that motion of the vehicle has changed from a moving state to a non-moving state; and
contemporaneously with the motion of the vehicle being determined to have changed from the moving state to the non-moving state, resume the media asset that was paused.

14. The system of claim 13, wherein the control circuitry is further configured to:
determine that the media asset is linear; and
retrieve the media asset from storage starting from a position at which the media asset was previously paused in response to determining that the media asset is linear to resume the media asset.

15. The system of claim 9, wherein the control circuitry is further configured to:
in response to determining that the motion state indicates that the vehicle is moving, generate a first option for presentation to the user; and
in response to determining that the motion state indicates that the vehicle is not moving, generate a second option for presentation to the user.

16. The system of claim 15, wherein the first option is unrelated to media consumption and the second option relates to media consumption.

* * * * *